(12) United States Patent
Ivkovich et al.

(10) Patent No.: US 8,642,170 B2
(45) Date of Patent: Feb. 4, 2014

(54) LOW THERMAL AND RADIATION CONDUCTIVITY COATING

(75) Inventors: Daniel P. Ivkovich, Fairfield, OH (US); William Randolph Stowell, Rising Sun, IN (US); Darrell Senile, Oxford, OH (US); Thomas W. Rentz, Cincinnati, OH (US); John F. Ackerman, Laramie, WY (US)

(73) Assignee: General Electric Company, Schenectady, NY (US)

( * ) Notice: Subject to any disclaimer, the term of this patent is extended or adjusted under 35 U.S.C. 154(b) by 1118 days.

(21) Appl. No.: 11/967,857

(22) Filed: Dec. 31, 2007

(65) Prior Publication Data

US 2009/0169898 A1 Jul. 2, 2009

(51) Int. Cl.
*B32B 5/16* (2006.01)
(52) U.S. Cl.
USPC ........................................... 428/323
(58) Field of Classification Search
USPC ........................................... 428/323
See application file for complete search history.

(56) References Cited

U.S. PATENT DOCUMENTS

| | | | | |
|---|---|---|---|---|
| 4,358,772 A | * | 11/1982 | Leggett | 343/872 |
| 4,479,994 A | * | 10/1984 | Berg | 428/195.1 |
| 5,759,932 A | * | 6/1998 | Sangeeta et al. | 501/85 |
| 6,465,090 B1 | * | 10/2002 | Stowell et al. | 428/325 |

* cited by examiner

*Primary Examiner* — Elizabeth A Robinson
(74) *Attorney, Agent, or Firm* — McNees Wallace & Nurick LLC

(57) ABSTRACT

A coating system that includes a plurality of portions, each portion comprising one or more layers. The coating system includes an outer portion, which is an infrared radiation (IR) interaction portion, that dissipates incident (IR). Underlying this outer portion is a performance portion. The performance portion comprises at least one layer that includes microspheres. Between the substrate and performance portion is a compliance portion. The compliance portion comprises at least one layer of high temperature material that has a coefficient of thermal expansion (CTE) intermediate the performance layer and the substrate. The compliance portion thus reduces any high temperature thermal mismatch between the substrate and the performance portion.

10 Claims, 3 Drawing Sheets

LOW THERMAL AND RADIATION CONDUCTIVITY COATING

FIELD OF THE INVENTION

The present invention is directed to a coating that reduces the thermal loading on parts exposed to hot temperatures, and in particularly, for components such as secondary seals in a gas turbine engines having augmentation

BACKGROUND OF THE INVENTION

High performance engines for military aircraft utilize augmentation, sometimes referred to as afterburners, for increased thrust. This augmentation injects additional fuel into the exhaust and ignites the fuel, thereby providing additional thrust. The components utilized to provide this thrust are located in the exhaust path of the engine, such as the spray bars and the igniters, and are exposed to the exhaust gases. Of course, the components downstream of the spray bars and igniters, such as the secondary seals, are exposed to elevated temperatures even higher than the exhaust temperatures as a result of the injection of additional fuel into the exhaust stream.

To protect the components in the exhaust stream and those downstream from the spray bars and the igniters due to the elevated temperatures from melting or other deterioration, these components have been coated with a thermal barrier coating system (TBC) comprising a top coat of 8-12 mils (0.008-0.012 inches) of yttrium-stabilized zirconia (YSZ). However, as jet engine temperatures have increased, with a resulting increase in the temperatures in the augmentor portion of the engine, the temperatures to which the coatings have been exposed have increased, so that even the most advanced of these alloys are operating in temperature regimes that can exceed their melting temperature.

Although the augmentors are subject to short duty cycles since the periods for which the additional thrust is required tends to be limited, the thermal loads have been sufficient to cause what appears to be localized melting and associated warpage in the vicinity of the localized melting on the edges of the seals. These thermal loads are the result of heat transferred from the hot gases of combustion in the exhaust both from the combustors and from providing augmented thrust as well as from radiation, typically infrared, when the augmentors are providing thrust (i.e. when the afterburners are lit). Since YSZ is substantially transparent to IR, the YSZ provides little benefit in protecting the substrate from thermal loads from this heat load mechanism. The IR is absorbed by the material underlying the YSZ, typically the substrate, resulting in additional heating of the substrate.

What is needed is a coating for metallic components operating in the hot gas stream of a gas turbine and subject to IR from combustion reduces thermal load on the substrate material so that incipient melting of the substrate is substantially reduced or eliminated. The coating should reduce the thermal load experienced by the substrate by reducing heat transfer from the hot gases of combustion and should reduce or eliminate the penetration of IR to the substrate.

SUMMARY OF THE INVENTION

A coating system is provided that includes a plurality of portions, each portion comprising one or more layers. The coating system includes an outer portion, which is an infrared radiation (IR) interaction portion, that dissipates incident (IR). Underlying this outer portion is a performance portion. The performance portion comprises at least one layer that includes microspheres. The outer portion may be a low emissivity portion (low-E) that reflects incident IR away from the component, or a high emissivity portion (high-E) that absorbs incident radiation and dissipates the absorbed incident radiation as heat. Between the substrate and performance portion is a compliance portion. The compliance portion comprises at least one layer of high temperature material that has a coefficient of thermal expansion (CTE) intermediate the performance layer and the substrate. The compliance portion thus reduces any high temperature thermal mismatch between the substrate and the performance portion. It may be desirable to roughen the substrate surface so that the compliance portion also can be applied so that the interface of the substrate surface and the compliance portion is interlocking, forming a mechanical bond between the two layers that improves the adherence of the compliance layer to the substrate.

An advantage of the present invention is that it is opaque to infrared radiation (IR). Thus, IR cannot penetrate below the outer portion to serve as a heat source for the underlying substrate, causing further heating of the substrate. IR is effectively eliminated as a heat source of the substrate by the outer portion.

While the outer portion protects the underlying portions from IR as a heat source, the performance portion of the coating system of the present invention advantageously provides thermal protection by performing as an insulator. Since this portion can include one or more layers of microspheres, its thickness can be increased or decreased as required to provide the thermal protection desired. Thus conduction of heat across the performance portion, although not eliminated, is reduced.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
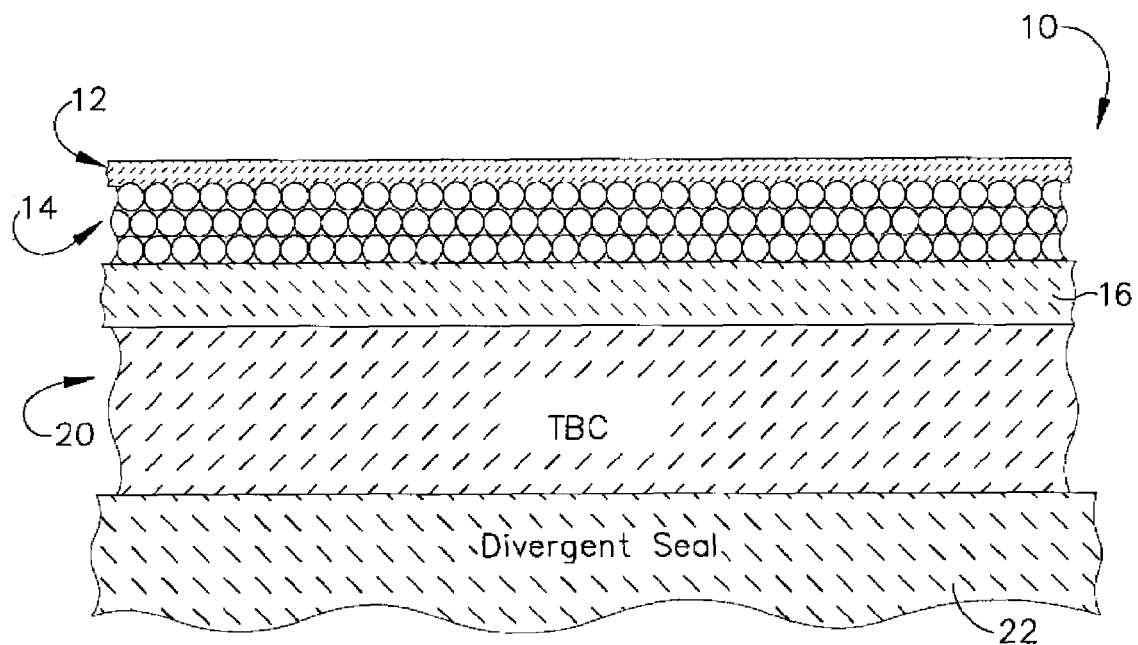
FIG. 1 depicts a cross-sectional schematic of the coating system of the present invention.

Referring to FIG. 1, the coating system 10 comprises an IR interactive portion 12 that overlies a performance portion 14. A compliance portion 16 is positioned between the performance portion 14 and the underlying substrate 22. The underlying substrate 22 may be ceramic or a metallic structure. A bond coat 20 may be applied between the substrate 22 and the compliance portion 16 to enhance the adhesion to the substrate 22.

The IR interactive portion 12 comprises one or more layers of a material that prevents the penetration of IR beneath it. The IR interactive portion 12 is the outermost layer of the material system and usually is a fluid boundary over which hot exhaust gases of combustion fluids flow. The defining characteristics of the IR interactive portion 12 are that it is opaque to IR. The IR interactive portion 12 may be a low emissivity (low-E) material or a high emissivity (high-E) material. One low-E material having the desired properties is an aluminosilicate glass comprising about 4-8% silica, about 5-13.5% yttrium stabilized zirconia (YSZ) and the balance alumina. Unless otherwise specified herein, all compositions are provided in weight percentages. The YSZ provides MIE scattering of the incident IR when the size of the YSZ particles comprising the layer is about one-tenth or more than the size of the wavelength scattered. YSZ is the preferred scattering material, although other high optical index lossless media, such as titania ($TiO_2$), ceria ($CeO_2$), and tantala ($Ta_2O5$) may also be used, either alone or in combination. These materials, provided as particulates to the green composition, are subject to the same size limitations as the YSZ particles to provide MIE scattering. The low-E material is preferred when no active cooling of the component, such as backside cooling or film cooling, is available. The low-E material reflects or scatters the incident IR away from the component back into the hot gas stream rather than being absorbed by the component. A high-E material is utilized when active cooling is available. The high-E material absorbs the IR and dissipates it as heat. The active cooling assists in removing the dissipated heat from the structure. Active cooling may be provided by backside cooling of the substrate or film cooling of the surface. One high-E material that can be used as the IR interactive portion 12 having these properties is an aluminosilicate glass comprising about 4-8% silica, about 18-28% iron chromite spinel and the balance alumina.

In order to improve adherence of the IR interactive portion 12, it may be desirable to apply the IR interactive portion 12 as a plurality of layers. The layer of the IR interactive portion opposite the performance portion 14 is an aluminosilicate glass such as described above. However, the layer of the IR interactive portion 12 adjacent the performance portion 14 is an aluminosilicate glass that includes up to about 10% ceramic microspheres. Because the overall thickness of the IR interactive portion 12 is only 2-4 mils (one mil=0.001 inches), microspheres having a size in the range of about 10 microns may be added to the layer of the IR interactive portion 12 adjacent the performance layer 14. The microspheres added to this layer serve to assist in relieving high temperature strain between the IR interactive portion 12 and the performance portion 14.

The performance portion 14 is an aluminosilicate glass that includes a high volume percentage of ceramic microspheres. The ceramic microspheres provide the performance portion 14 with its insulative characteristics. The overall thickness of performance portion 14 controls the overall insulative performance of the coating system. The performance portion can be applied in thicknesses of from about 7 mils to about 250 mils. While the performance portion can be applied as a sprayed layer or a cast layer, it preferably is applied in layers as a green tape having thicknesses of from 7-20 mils per layer. In order to improve adhesion to the IR interactive portion, the amount of ceramic microspheres can be varied in each applied layer so as to provide a graded composition of microspheres. A preferred performance portion has a fired composition of about 4-8% silica, about 10-52% ceramic microspheres and the balance alumina. However, the ceramic microsphere composition in the performance portion can be graded so that the layer of the performance portion 14 adjacent to the IR interactive portion 12 includes about 10-20% microspheres, while the layer of the performance portion adjacent the compliance portion and closest to the substrate includes up to as high as 52% microspheres.

Figure 2:
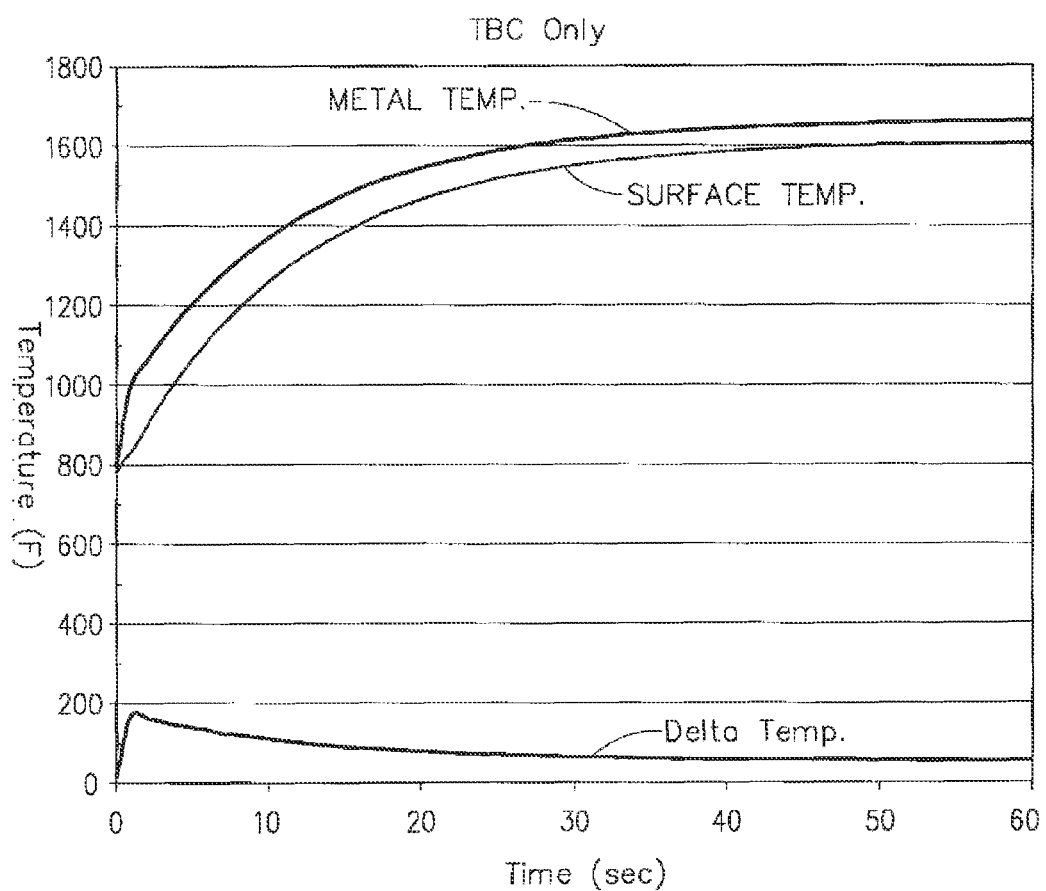
FIG. 2 is a graph depicting the calculated temperature profile of a substrate coated with a standard thermal barrier coating of the present invention without microspheres.
Figure 3:
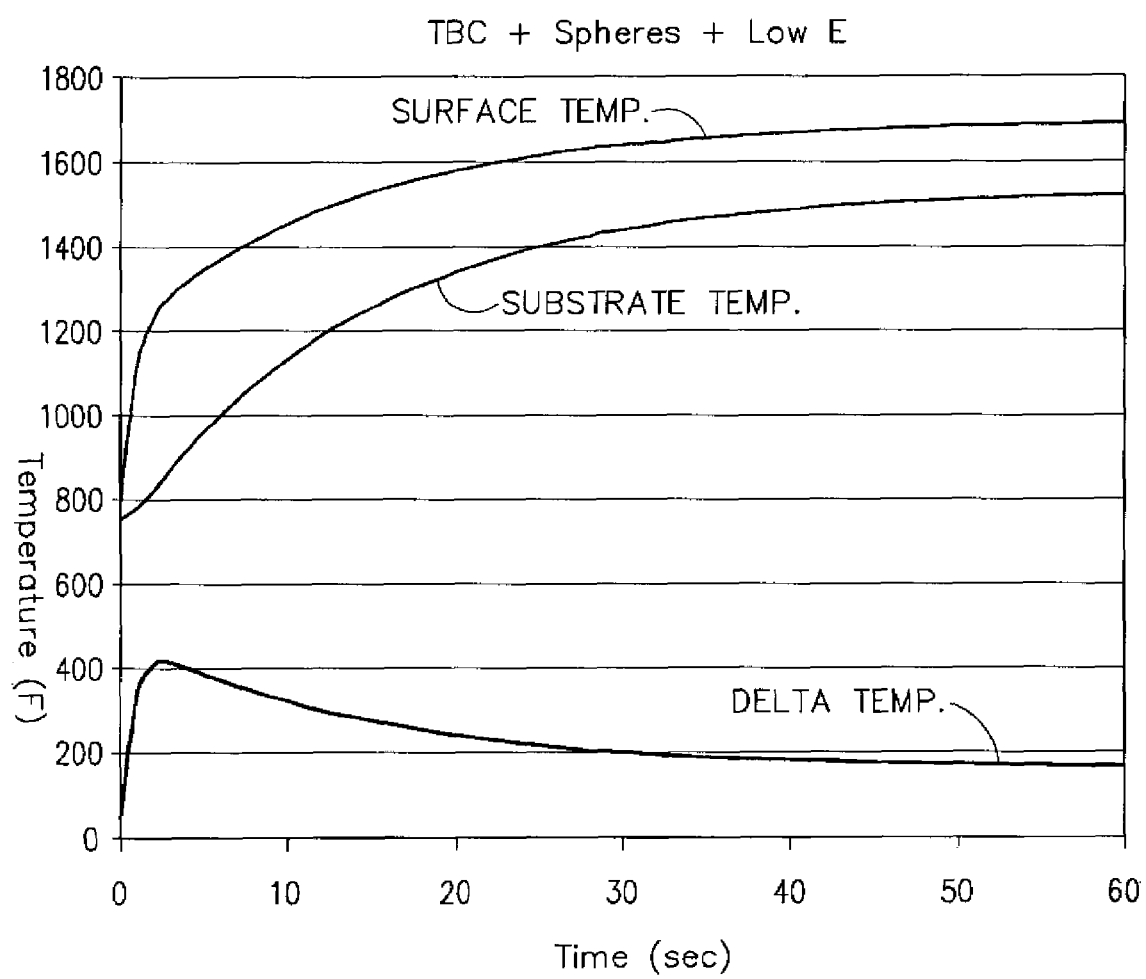
FIG. 3 is a graph depicting the calculated temperature profile of a substrate coated with a 15 mil thick performance layer of the present invention with a loading of about 50% microspheres.

The improvement of the coatings of the present invention is demonstrated in FIGS. 2 and 3. The coating of the present invention is applied with a 15 mil thick performance portion 14 having a loading of about 50% microspheres, which significantly improves the thermal performance of the coating system. FIG. 2 depicts the delta temperature improvement of the substrate when coated with a standard TBC (YSZ), while FIG. 3 depicts the delta temperature improvement of the substrate when coated with the performance portion of the present invention. At steady state, defined as about 1 minute in a standard test in which the coating is exposed to a flame, while the backside of the substrate is actively cooled, the performance portion 14 of the present invention reduces the temperature of the substrate metal by about 150° F. as compared to a prior art YSZ thermal barrier coating without the microspheres. Further improvements in thermal performance are anticipated as the thickness of the performance portion is increased from about 15 mils to greater thicknesses within the acceptable range of thicknesses.

The compliance portion 16 is used to match the performance portion 14 to the underlying substrate 22, whether this material comprises a ceramic or a metallic structure. The compliance portion 16 is applied to reduce any mismatch that may occur between the substrate and the performance portion 14, which is highly loaded with microspheres at its interface nearest the substrate 22. A preferred compliance layer is, in its fired condition, an aluminosilicate glass that is referred to ATJ72. ATJ72 has a green composition comprising, about 15-60% evaporable solvent, 0-65% micron sized aluminum oxide, 2-20% silicone, about 1-10% dispersant, and about 3-30% plasticizers. The preferred dispersant is Merpol-A, while preferred plasticizers include B-79 and DBP. The compliance portion 16 can be formed into a tape and applied in layers to the desired thickness. The thickness of the compliance portion 16 can vary from about 2 mils to about 20 mils, although a preferred thickness is about 8 mils.

Each of the portions 12, 14, 16, may be fabricated by available techniques such as casting or spraying, although the best mode of practicing the invention is by preparing tapes and building up the coating over the substrate as tape layers. It may be desirable to roughen the outer surface of the substrate prior to application of the compliance portion, to improve the mechanical adhesion of the compliance portion 16. Following the build-up of the coating portions over the substrate, the coated substrate is placed in an autoclave and covered with a vacuum bag. Each of the layers is then cured and consolidated by slowly raising the temperature of the autoclave to about 300° F. at a pressure of about 50 psi. After removal of the coated substrate from the autoclave, the coated substrate is then fired and sintered to a temperature of about 1750° F. to convert the various portions of the cured coating to an aluminosilicate glassy-ceramic. There is an intermediate temperature range at which the material has thermoplastic and thermoset characteristics, with the thermoplastic behavior predominating at the low end of the intermediate temperature range and thermoset behavior predominating at the high end of the intermediate range. As the temperature continues to be increased, and as the plasticizers burn out, the material becomes a thermoset. The material transitions from a glass to a glassy-ceramic in the range of 1200-1500° F., so that at a firing temperature of 1750° F., the material is substantially a glassy ceramic.

EXAMPLE I

A coating system 10 of the present invention was prepared by fabricating an IR interactive portion 12 as a tape, a performance portion as a tape and a compliance portion as a tape.

The compliance portion 16 was prepared as a slurry by mixing about 75 g of reagent grade ethyl alcohol, about 30 g of silicone SR-355, and about 9.0 g of Merpol A in a sealed container that includes 1 inch alumina ball media and mixing until the silicone is dispersed. About 115.7 g of alumina A14 and about 84.3 g of alumina SM-8 were added to the container, resealed and milled on a ball mill for about 1-2 hours. Next, about 7 g of DBP was added to the container, which was resealed and milled on a ball mill for about 8-13 hours. Finally, about 14.0 g of B79 was added to the container, which was resealed and milled for about 2 hours to form the final slurry. The slurry was then tape cast onto a silicone-coated Mylar® tape and doctor-bladed to a tape thickness of about 8 mils. The tape was allowed to dry.

The performance portion 14 was prepared as a slurry by mixing about 75 g of reagent grade ethyl alcohol, about 30 g of silicone SR-355, and about 9.0 g of Merpol A in a sealed container that includes 1 inch alumina ball media and mixing until the silicone is dispersed. About 100 g of alumina A16SG and 117.5 g of ceramic microspheres were added to the container, resealed and milled on a ball mill for about 1-2 hours. All ball milling was performed at a rate so that the alumina milling media did not damage the ceramic microspheres. Next, about 7 g of DBP was added to the container, which was resealed and milled on a ball mill for about 8-13 hours. Finally, about 14.0 g of B79 was added to the container, which was resealed and milled for about 2 hours to form the final slurry. The slurry was then tape cast onto a silicone-coated Mylar® tape and doctor-bladed to a tape thickness of about 25 mils. The tape was allowed to dry.

A low-E IR interactive portion 12 was prepared as a slurry by mixing about 75 g of reagent grade ethyl alcohol, about 30 g of silicone SR-355, and about 9.0 g of Merpol A in a sealed container that includes 1 inch alumina ball media and mixing until the silicone is dispersed. About 100 g of alumina A14 about 50 g of alumina A14 and about 25 g of YSZ powder were added to the container, resealed and milled on a ball mill for about 1-2 hours. Next, about 7 g of DBP was added to the container, which was resealed and milled on a ball mill for about 8-13 hours. Finally, about 14.0 g of B79 was added to the container, which was resealed and milled for about 2 hours to form the final slurry. The slurry was then tape cast onto a silicone-coated Mylar® tape and doctor-bladed to a tape thickness of about 4 mils. The tape was allowed to dry.

A substrate was prepared by cleaning the outer surface with a solvent and then drying the surface at a temperature of about 250° F., followed by placing the substrate in a fume hood and wiping it with acetone. Nylon film is place over the cleaned surface until ready for use. Then, the compliance portion 16 was applied over the substrate, followed by application of the performance portion 14 and finally followed by the IR interactive portion 12. For this example, each of the portions comprised a single layer, although additional layers can be applied as part of each portion to achieve the desired thermal or mechanical results. This provides a substrate with the green coating composition of the present invention that is ready for further processing.

EXAMPLE 2

A coating system 10 of the present invention was prepared by fabricating an IR interactive portion 12 as a tape, a performance portion as a tape and a compliance portion as a tape. The compliance portion and the performance portion were prepared as set forth in Example 1.

Each of the compositions comprising the different portions is prepared by forming a slurry. The portions can be applied by any available technique including spraying, casting or forming a tape, which involves tape casting. Although each of the portions 12, 14 and 16, may have a uniform composition, more flexibility in obtaining desirable mechanical properties and thermal performance can be obtained by grading the portions, and in particular by grading portions 12 and 14. This means that the compositions across the portions will vary slightly in a predetermined fashion, thereby achieving the desired gradation.

A high-E IR interactive portion 12 was prepared as a slurry by mixing about 75 g of reagent grade ethyl alcohol, about 30 g of silicone SR-355, and about 9.0 g of Merpol A in a sealed container that includes 1 inch alumina ball media and mixing until the silicone is dispersed. About 100 g of alumina A14 about 50 g of alumina A14 and about 50 g of iron-chromite were added to the container, resealed and milled on a ball mill for about 1-2 hours. Next, about 7 g of DBP was added to the container, which was resealed and milled on a ball mill for about 8-13 hours. Finally, about 14.0 g of B79 was added to the container, which was resealed and milled for about 2 hours to form the final slurry. The slurry was then tape cast onto a silicone-coated Mylar® tape and doctor-bladed to a tape thickness of about 4 mils. The tape was allowed to dry.

A substrate was prepared by cleaning the outer surface with a solvent and then drying the surface at a temperature of about 250° F., followed by placing the substrate in a fume hood and wiping it with acetone. Nylon film was placed over the cleaned surface until ready for use. Then, the compliance portion 16 was applied over the substrate, followed by application of the performance portion 14 and finally followed by the IR interactive portion 12. For this example, each of the portions comprised a single layer, although additional layers can be applied as part of each portion to achieve the desired thermal or mechanical results. This provided a coated substrate with the green coating composition of the present invention that is ready for further processing.

A slurry is prepared in each composition by utilizing an evaporable solvent. The amount of the evaporable solvent will vary depending upon the method used to apply the portion. A spray will require more fluidity, and hence more solvent, than a casting, which may require more fluidity than a tape casting. The solvent is varied to achieve the desired fluidity. When the composition in a portion is graded, it is necessary to allow an applied composition to dry before applying the next gradation. Of course, when the compositions are formed into tapes, the solvent is dried from the tape before use. A preferred evaporable solvent is alcohol. Alcohols having shorter carbon chains, such as ethanol will dry faster than those having longer carbon chains. The amount of solvent and the type of solvent added to the slurry will affect the drying time of the composition.

An evaporable liquid may be added to the slurries forming the green compositions as a dispersant or surfactant in relatively small quantities. When utilized, the evaporable liquid is an organo-phosphate ester selected from the group consisting of PS21A and Merpol A. The surfactant serves as a dispersing aid for the constituent materials of the composition and allows for a more stable mix as well as providing improved viscosity by reducing or preventing agglomeration of particles. Advantageously, the surfactant also enhances the green strength of the coating. These properties are beneficial when the composition is formed into a tape.

Alumina is added as a constituent of the aluminosilicate glass that forms the matrix. The alumina can be added in a variety of forms depending upon the properties desired of the composition. The types of alumina include A16SG, A14 and SM8, which vary in size. The size of the alumina can affect the surface finish of the composition, the amount of solvent required to form a slurry, the microstructure of the fired composition, and the amount and quantity of materials that can be added to the composition (packing density), which can ultimately affect important mechanical properties. Alumina is transparent to IR. A16SG is a superground, submicron alumina having a size distribution in the range of 0.05-0.8 μm. At least about 5% of this submicron alumina is required to produce a smooth surface finish, both on the surface of the tape against the release layer, such as a Teflon release layer, and on the final surface of a component when the tape is applied to the component. Submicron alumina is preferred in this first composition. This submicron filler is a substantially spherically shaped particle having a low aspect ratio with a particle packing that substantially completely fills the interstices between any macro alumina and other submicron materials that may be included. SM-8 alumina has a particle size distribution in the range of about 0.1-0.6 μm and an average surface area of about 10 m/gm. Although submicron in size, SM-8 has a more narrow size distribution than A16SG. A14 (–325) is a coarser alumina having an average particle size distribution in the range of 2.4-3.2 μm. Both A16SG and SM8 can be used as a fine alumina added to fill the gaps between the coarser A14. A14 and AI6SG are available from Almatis, formerly Alcoa of Pittsburgh, Pa. SM-8 is an agglomeration having an average size of about 0.3 p and an average surface area of about 10 m/gm. SM-8 is available from Baikowski International Corp., Charlotte, N.C.

A glass-forming silicon-based material forms the binder for the refractory oxide powder on firing. The silicon-based material has a low dielectric constant and preferably is oxidizable, being selected from the group consisting of silicone, fumed silica, colloidal silica, ground silica powder and combinations thereof. The preferred silicon-based material is silicone, such as SR-355, a silicone composition that can be obtained through Apollo Plastics Corporation of Jersey City, N.J. An equivalent silicone composition is available from Dow Chemical Corp. SR-355 initially forms a silicon polymer that yields water as a by-product of its formation by curing and/or cross-linking. SR-355 preferably is soluble in the evaporable solvent. SR-355 is soluble in the preferred evaporable solvent, alcohol. The water must be removed from the matrix during the drying process of the slurry composition. This oxidizable silicon-based material forms a portion of the matrix of the composition upon sintering. The silicon polymer converts to silica on firing at elevated temperatures.

Plasticizers maintain the composition as pliable at low temperature and adhere the composition together into a plastic solid material, as the solvent is removed, and after what is termed as plastic curing, about 150° F. and higher. Plasticizers are very desirable for tapes, but can provide desirable properties to both cast compositions and sprayed compositions after drying but before curing or firing. At low temperatures, the temperatures of handling and application of tapes, the tapes are green and pliable. The green compositions have a softening point, and as the temperature is raised, they pass through the softening point, but remain substantially thermoplastic in nature. Preferred plasticizers are DBP and B-79. DBP is available from Eastman Chemicals of Kingsport, Tenn. and B-79 is available from Solutia, formerly Monsanto.

As the temperatures continue to be raised to the plastic curing temperature, however, cross-linking of the silicone occurs and becomes more prominent as the temperature continues to rise. As a result of the cross-linking of the polymer, the silicone acts to adhere the composition together. During the firing and sintering operation, the temperature continues to be raised and the firing temperature is approached. After firing, silicone is converted to silica and the final product is a ceramic or glass ceramic. Preferred plasticizers are DBP and B-79, and dispersants such as Merpol A, burn out as the composition is fired, burning out in the range of about 400-500° F., typical of carbon-containing materials. Below the curing temperature, these plasticizers provide green strength to the composition as the solvent, alcohol, evaporates. B-79 is an organic plasticizer, which is a proprietary mixture available from Solutia. Below the firing temperature, these plasticizers provide additional bonding strength for the cured composition.

Additional materials are added to each of the layers in an effort to tailor it to provide it with specific properties. Thus, to provide IR interactive portion 12 as a low-E layer with the reflectance required to reflect incident IR, a material that can scatter incident IR, such as YSZ, is added. Normally, YSZ is undesirable for use as a reflector of IR, as it has both a high real and imaginary index of refraction. It has been found that by using very fine zirconia YSZ provides MIE scattering of the incident IR when the size of the YSZ particles is about one-tenth or more than the size of the wavelength scattered. The IR of interest has a wavelength of 0.9-2.5 μm. YSZ particles of the requisite size provides IR interactive portion with the low-E properties required. To provide IR interactive portion as a high-E layer, it is necessary to add a material to absorb the incident IR and then dissipate it within the layer as heat. One such material is iron-chromite spinel. This material is available under the trade name of Black 128 Shepherd Pigment from Shepherd Pigments of Fairfield, Ohio. Another material that is satisfactory is lanthanum strontium manganate (LSM).

The performance portion includes ceramic microspheres. These ceramic microspheres have a preferred size distribution in the range of about 10-150 microns. While ceramic microspheres are available from a number of manufacturers, a preferred type of microspheres are Extendospheres SL-150 Hollow Spheres, available from Sphere One. The ceramic microspheres impart the thermal reduction characteristics to the coating system 10, which is one of the important aspects of the invention. The microspheres can be applied as a uniform distribution across the performance portion 14, as discussed above, or the distribution may be graded to achieve desired mechanical or thermal properties.

The coating of the present invention finds particular use in augmentors for high performance military engines. Here, components such as spray bars, secondary seals, nozzle liners, and flame holders are constantly exposed to the hot gases of combustion from the combustor portion of the engine. In addition, the pilot may demand additional thrust causing the augmentor to combust fuel, further adding to the heat loads of these components in terms of thermal heat as well as IR. Even those these periods of augmentor operation are short in terms of the operating life of the engine, the thermal load contributed by its operation may be sufficient to raise the temperature of these components above their melting point. The present invention provides a significant reduction in temperature of the substrate as compared to a prior art coating, as indicated in FIGS. 2 and 3. The lower curve represents the temperature difference, Delta Temp., between the surface and the substrate with the coating of the present invention and the prior art coating. At substantially steady state conditions, which are reached in about 30 seconds, the present invention provides an improvement of about 150° F. over prior art coatings. However, within a ten-second time frame, indicated at the left end of the graphs of Delta Temp. of FIGS. 2 and 3, which can represent a short burst of augmentation, the temperature improvement offered by the present invention can be more than 200° F.

FIG. 3 represents a thickness of the performance portion of 15 mils. Additional improvements can be achieved using a thicker performance portion. Whether a thicker performance portion can be used depends upon the environment in which the coating is used. As noted, the coating thickness can vary from 7-250 mils. However, depending on the environment, the coating may not be usable at full thickness. Consideration must be given to factors such as spalling and erosion, which may limit the use thickness of the present invention in certain environments. In addition, whether a low-E layer or a high-E layer is used in the IR interactive portion 12 may be dependent on the availability of active cooling. A high-E layer dissipates heat, so an active cooling mechanism for removal of dissipated heat may be necessary to prevent heat build-up. While a low-E layer also would benefit from an active cooling mechanism, since it removes incident IR by reflection or scattering, active cooling may not be as important or critical for its proper operation.

While the present invention finds particular use with augmentor components, its use is not so limited. It may also find use in other portions of a gas turbine engine such as within the combustor. Here, much thicker YSZ coatings are used, and it is expected that a thicker coating of the present invention can be applied with significant improvements in substrate temperatures as compared to the YSZ coatings. The present invention may also be used within the turbine portion of the engine. It can also find use in the exhaust liner of engines aft of the turbine and fore of the augmentor, as well as in exhaust liners of unaugmented engines.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A coating system for use over a substrate, comprising:
an IR interaction portion comprising at least one layer, an outermost layer of the IR portion dissipating incident infrared radiation in the range of 0.9-2.5 micrometers while being transparent to incident radar;
a performance portion underlying and in contact with the IR interaction portion, the performance portion further comprising at least one layer that includes microspheres, the performance portion being transparent to radar and acting as a thermal insulator;
a compliance portion underlying and in contact with the performance portion comprising at least one layer that acts to reduce thermal mismatch between the performance portion and the substrate;
wherein the performance portion comprises an aluminosilicate glass that includes ceramic microspheres;
wherein the ceramic microsphere composition is graded so that the performance portion adjacent the compliance portion includes microspheres up to 52% by weight, in its fired condition; and the performance portion adjacent the IR interaction portion includes 10-20% microspheres by weight, in its fired condition; and
wherein the substrate comprises a metallic material.

2. The coating system of claim 1 wherein the performance portion includes, by weight, in its fired condition, about 4-8% silica.

3. The coating system of claim 1 wherein the performance portion has a thickness of about 7 mils (0.007") to about 250 mils (0.250").

4. The coating system of claim 1 wherein the compliance portion has a thickness of from about 2 mils (0.002") to about 20 mils (0.020").

5. The coating system of claim 1 wherein the substrate further comprises a bond coat.

6. The coating system of claim 1 wherein the IR interaction portion comprises at least one layer that is a low emissivity layer.

7. The coating system of claim 1 wherein the IR interaction portion has a thickness of about 2-4 mils.

8. A coating system for use over a substrate, comprising:
an IR interaction portion comprising at least one layer, the IR portion dissipating incident infrared radiation while being transparent to incident radar;
a performance portion underlying and in contact with the IR interaction portion, the performance portion further comprising at least one layer that includes hollow ceramic microspheres, the performance portion being transparent to radar and acting as a thermal insulator;
a compliance portion underlying and in contact with the performance portion comprising at least one layer that acts to reduce thermal mismatch between the performance portion and the substrate;
wherein the compliance portion comprises in weight percent, in its green condition,
about 15-65% evaporable solvent,
about 0-65% micron sized aluminum oxide,
about 2-20% silicone,
about 1-10% dispersants,
about 3-30% plasticizers;
wherein the IR interaction portion comprises about 4-8% silica and about 5-13% IR-scattering material, the IR-scattering material is YSZ, and
the balance alumina, wherein the IR scattering material is sized to provide MIE scattering of incident IR in the 0.9-2.5 micrometers range, wherein the balance of the alumina is provided as submicron alumina and micron-sized alumina, with up to 80% of the alumina being submicron alumina and up to 40% of the alumina being micron-sized alumina, and
wherein the IR interaction portion comprises at least one layer that is a low emissivity layer.

9. The coating system of claim 8 wherein the substrate comprises a metallic material.

10. The coating system of claim 9 wherein the substrate further comprises a bond coat.

* * * * *